United States Patent
Nozawa (10) Patent No.: US 10,338,536 B2
(45) Date of Patent: Jul. 2, 2019

(54) ELECTRONIC TIMEPIECE

(71) Applicant: Seiko Epson Corporation, Tokyo (JP)

(72) Inventor: Toshiyuki Nozawa, Okaya (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 15/460,659

(22) Filed: Mar. 16, 2017

(65) Prior Publication Data

US 2017/0277128 A1 Sep. 28, 2017

(30) Foreign Application Priority Data

Mar. 28, 2016 (JP) ................................. 2016-064042

(51) Int. Cl.
| | |
|---|---|
| *G04B 19/06* | (2006.01) |
| *G04B 47/06* | (2006.01) |
| *G04G 21/02* | (2010.01) |
| *G01C 17/04* | (2006.01) |
| *G01C 17/28* | (2006.01) |

(52) U.S. Cl.
CPC .......... *G04B 47/065* (2013.01); *G04B 19/06* (2013.01); *G04G 21/02* (2013.01); *G01C 17/04* (2013.01); *G01C 17/28* (2013.01)

(58) Field of Classification Search
CPC ..... G04B 74/065; G04B 47/065; G04G 21/02
See application file for complete search history.

(56) References Cited

U.S. PATENT DOCUMENTS

| | | | | |
|---|---|---|---|---|
| 5,596,551 A | | 1/1997 | Born et al. | |
| 5,598,381 A | * | 1/1997 | Bornand | G04G 9/0064 368/10 |
| 5,697,162 A | * | 12/1997 | Bornand | G01C 17/10 33/320 |
| 5,790,477 A | * | 8/1998 | Hauke | G01C 21/20 368/10 |
| 6,185,157 B1 | * | 2/2001 | Farine | G01S 3/02 33/349 |
| 6,542,120 B1 | * | 4/2003 | Gilbertson | G01S 19/34 342/357.64 |
| 6,751,164 B1 | * | 6/2004 | Sekiguchi | G04C 3/146 368/21 |
| 7,125,145 B2 | * | 10/2006 | Gardiner | B25F 1/04 362/253 |

(Continued)

FOREIGN PATENT DOCUMENTS

| | | |
|---|---|---|
| JP | 08-220256 A | 8/1996 |
| JP | 2004-309461 A | 11/2004 |

(Continued)

*Primary Examiner* — Daniel P Wicklund
(74) *Attorney, Agent, or Firm* — Harness, Dickey & Pierce, P.L.C.

(57) ABSTRACT

An electronic timepiece includes a magnetic sensor that serves as a magnetic detection unit, a GPS reception unit that serves as a reception unit receiving positional information of a current position, a time zone setting unit that sets a time zone, a specifying unit that specifies a declination angle based on the positional information of the current position, a decision unit that decides a direction of a due north based on an output of the magnetic sensor and a declination angle, and an azimuth display unit that displays the direction of the due north decided by the decision unit.

7 Claims, 6 Drawing Sheets

(56) References Cited

U.S. PATENT DOCUMENTS

| | | | | |
|---|---|---|---|---|
| 7,345,955 | B1* | 3/2008 | Campbell | G04G 9/00 368/10 |
| 7,466,633 | B2 | 12/2008 | Giauque et al. | |
| 2002/0023362 | A1* | 2/2002 | Kato | G01C 17/38 33/356 |
| 2004/0013043 | A1* | 1/2004 | Haq | G04G 9/0076 368/21 |
| 2004/0187328 | A1 | 9/2004 | Satoh et al. | |
| 2004/0233788 | A1* | 11/2004 | Plancon | G04B 19/082 368/11 |
| 2004/0254727 | A1* | 12/2004 | Ockerse | G01C 17/28 701/535 |
| 2006/0203617 | A1* | 9/2006 | Matthey | G01C 17/30 368/11 |
| 2013/0116967 | A1* | 5/2013 | Akcasu | G04G 9/00 702/150 |
| 2016/0209813 | A1* | 7/2016 | Hasegawa | G04R 20/02 |
| 2018/0046143 | A1* | 2/2018 | Gu | G04G 13/026 |

FOREIGN PATENT DOCUMENTS

| | | |
|---|---|---|
| JP | 2006-094368 A | 4/2006 |
| JP | 2006-250933 A | 9/2006 |
| JP | 2008-157954 A | 7/2008 |
| JP | 2011-027516 A | 2/2011 |

* cited by examiner

| DIFFERENCE FROM UTC | TIME ZONE, REPRESENTATIVE CITY NAME |
|---|---|
| ±0:00 | LONDON |
| +1:00 | PARIS/BERLIN |
| +2:00 | CAIRO |
| +3:00 | MOSCOW |
| +4:00 | DUBAI |
| +5:00 | KARACHI |
| +6:00 | DACCA |
| +7:00 | BANGKOK |
| +8:00 | HONG KONG |
| +9:00 | TOKYO |
| +10:00 | SYDNEY |
| +11:00 | NOUMEA |
| +12:00 | WELLINGTON |
| +13:00 | DST OF WELLINGTON |
| -11:00 | MIDWAY |
| -10:00 | HONOLULU |
| -9:00 | ANCHORAGE |
| -8:00 | LOS ANGELES |
| -7:00 | DENVER |
| -6:00 | CHICAGO |
| -5:00 | NEW YORK |
| -4:00 | CARACAS |
| -3:00 | RIO DE JANEIRO |
| -2:00 | DST OF RIO DE JANEIRO |
| -1:00 | AZORES ISLANDS |

ELECTRONIC TIMEPIECE

BACKGROUND

1. Technical Field

The present invention relates to an electronic timepiece that has a compass function.

2. Related Art

In the related art, wristwatches having electronic compass functions contain biaxial or triaxial magnetic sensors, obtain the magnetic north by measuring azimuths of geomagnetism, and point the azimuths digitally or using pointing hands. Such wristwatches can also point the due north by correcting declination angles with respect to the azimuths of the magnetic north obtained with the magnetic sensors. Normally, declination angles are set in accordance with methods in which users input declination angle values written on maps or the like as numerical values or orient timepieces toward the due north (for example, JP-A-2006-250933).

However, in the method of JP-A-2006-250933, it is necessary for users to examine declination angle information or it is necessary for users to know the due north, and thus preparation is complicated. Declination angles can be calculated from geomagnetic models, and thus declination angles can also be calculated by obtaining the positions of devices on the Earth. Accordingly, when the positions of devices can be obtained by GPS or the like, declination angles can also be automatically set. However, in wristwatches in which usable power is restricted, position coordinates may not be frequently acquired due to restriction on power consumption.

SUMMARY

An advantage of some aspects of the invention is to provide an electronic timepiece capable of specifying a declination angle without making complicated preparation while suppressing power consumption.

An electronic timepiece according to an aspect of the invention includes: a magnetic detection unit; a reception unit that receives positional information of a current position; a specifying unit that specifies a declination angle based on the positional information; a decision unit that decides a direction of a due north based on a output of the magnetic detection unit and a declination angle; and an azimuth display unit that displays the direction of the due north decided by the decision unit.

According to the aspect of the invention, when the reception unit receives the positional information of the current position, the specifying unit specifies the declination angle based on the positional information. The decision unit decides the direction of the due north based on the declination angle and the output of the magnetic detection unit. The azimuth display unit displays the direction of the due north decided by the decision unit. Accordingly, even when the user does not examine and input the declination angle or execute a complicated job of orienting the electronic timepiece toward the due north, the declination angle can be specified.

In the electronic timepiece according to the aspect of the invention described above, the electronic timepiece may further include a time zone setting unit that sets a time zone. The specifying unit may specify the declination angle based on the positional information used when the time zone setting unit sets the time zone. According to the aspect of the invention with this configuration, the time zone setting unit sets the time zone based on the positional information of the current position received by the reception unit. The specifying unit specifies the declination angle based on the positional information used when the time zone is set. Accordingly, the positional information of the current position is received at a time in the reception unit. Therefore, the declination angle can be specified while suppressing power consumption and even when the user does not execute a complicated job.

In the electronic timepiece according to the aspect of the invention described above, the electronic timepiece may further include a declination angle display unit that displays the declination angle specified by the specifying unit; and a declination angle adjustment unit that adjusts the declination angle displayed by the declination angle display unit according to the user's manipulation. According to the aspect of the invention with this configuration, when the declination angle is specified by the specifying unit, the declination angle display unit displays the specified declination angle. The declination angle adjustment unit adjusts the declination angle displayed by the declination angle display unit according to a user manipulation. Accordingly, since the declination angle specified by the specifying unit and displayed by the declination angle display unit serves as a reference to adjust the declination angle, the declination angle can be set through minimum adjustment.

In the electronic timepiece according to the aspect of the invention described above, the specifying unit may specify the declination angle using a numerical equation indicating a geomagnetism distribution. According to the aspect of the invention with this configuration, the specifying unit specifies the declination angle using the numerical equation indicating the geomagnetism distribution. Therefore, even when the user does not examine and input the declination angle or execute a complicated job of orienting of the electronic timepiece toward the due north, the declination angle can be specified.

In the electronic timepiece according to the aspect of the invention described above, the electronic timepiece may further include a storage unit that stores a declination angle table in which a plurality of declination angles are associated with a plurality of pieces of positional information. The specifying unit may specify the declination angle using the declination angle table. According to the aspect of the invention with this configuration, when the positional information of the current position is received by the reception unit, the specifying unit reads the declination angle associated with the positional information from the declination angle table and specifies the declination angle. Accordingly, even when the user does not examine and input the declination angle or execute a complicated job of orienting of the electronic timepiece toward the due north, the declination angle can be specified.

In the electronic timepiece according to the aspect of the invention described above, the storage unit may store the declination angle table so that the declination angle table is able to be rewritten. According to the aspect of the invention with this configuration, even when the declination angle changes over time, the appropriate declination angle is specified by rewriting the declination angle table stored in the storage unit on a new declination angle table in accordance with the declination angle changed over time.

In the electronic timepiece according to the aspect of the invention described above, the electronic timepiece may further include a time zone setting unit that sets a time zone according to a manipulation on a pointing hand by a user. The specifying unit may be a specifying unit that starts specifying the declination angle according to a starting manipulation by the user. The electronic timepiece may further include a declination angle specifying urging unit that urges the starting manipulation in a case in which the time zone setting unit sets the time zone. According to the aspect of the invention with this configuration, when the time zone is set by the time zone setting unit according to the manipulation on the pointing hand by the user, the declination angle specifying urging unit urges the user to execute the starting manipulation of specifying the declination angle. When the user executes the starting manipulation according to the urging of the starting manipulation, the specifying unit starts specifying the declination angle. Accordingly, since the specifying of the declination angle is urged at a timing at which it is necessary to specify the declination angle, the declination angle can be specified while suppressing power consumption.

In the electronic timepiece according to the aspect of the invention described above, the electronic timepiece may further include a time zone setting unit that sets a time zone according to a manipulation on a pointing hand by a user. The specifying unit may specify the declination angle in a case in which the time zone setting unit sets the time zone. According to the aspect of the invention with this configuration, when the time zone is set by the time zone setting unit according to a manipulation on the pointing hand by the user, the specifying unit starts specifying the declination angle. Accordingly, since the specifying of the declination angle is urged at a timing at which it is necessary to specify the declination angle, the declination angle can be specified while suppressing power consumption.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, preferred embodiments of the invention will be described in detail with reference to the drawings. The dimensions and scales of the units in the drawing are appropriately different from actual dimensions and scales. Since the embodiments to be described below are specific examples suitable for the invention, various technically preferred limitations are imposed. The scope of the invention is not limited to such forms unless otherwise mentioned to particularly limit the invention in the following description.

First Embodiment

Figure 1:
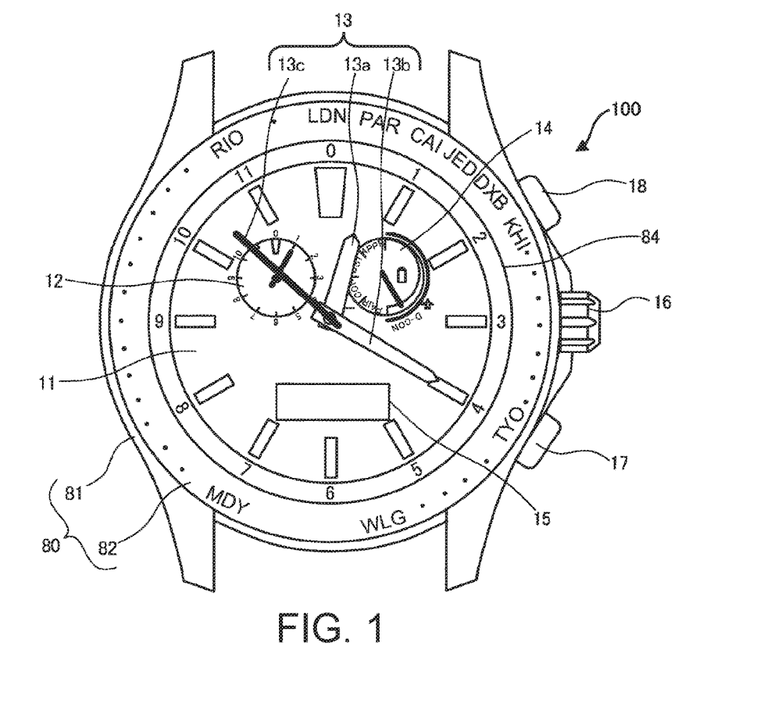
FIG. 1 is a plan view illustrating an electronic timepiece according to a first embodiment of the invention.

First, a first embodiment of the invention will be described with reference to FIGS. 1 to 6. FIG. 1 illustrates an electronic timepiece 100 according to the first embodiment of the invention. The electronic timepiece 100 is an electronic timepiece that is driven by power generated by a solar panel or a battery charged with the power. The electronic timepiece 100 includes an exterior case 80. The exterior case 80 is configured such that a bezel 82 formed of ceramic or metal is fitted in a base body 81 formed of metal and configured internally in a cylindrical shape. In the embodiment, the exterior case is configured with two components, but may be configured with one component.

A discoid letter plate 11 is disposed as a time display portion on the internal circumferential side of the bezel 82 and pointing hands 13 displaying a time, a date, and the like is disposed on the letter plate 11. The pointing hands 13 are configured with an hour hand 13a, a minute hand 13b, and a second hand 13c. The second hand 13c is an azimuth pointing hand in a case in which a compass function is operated. The details will be described below. An opening on the front surface of the exterior case 80 is covered with a cover glass 84 via the bezel 82. The internal letter plate 11 and pointing hand 13 (the hour hand 13a, the minute hand 13b, and the second hand 13c) can be viewed through the cover glass 84.

In the electronic timepiece 100, a time can be manually corrected by manually manipulating a crown 16 and the compass function can be operated by manually manipulating a manipulation button 17. Further, by manually manipulating the manipulation button 17 and a manipulation button 18, it is possible to operate a time zone selection function. The details of the compass function and the time zone selection function will be described below.

The electronic timepiece 100 includes a chronograph hour hand small window 12, an indicator 14, and a liquid crystal display unit 15 in the letter plate 11. The chronograph hour hand small window 12 displays a time when a chronograph function is operated. The indicator 14 displays various functions such as a battery charging state. The chronograph hour hand small window 12 and the indicator 14 are used to display a declination angle when the compass function is operated. The details thereof will be described below. The liquid crystal display unit 15 is used to display various kinds of information.

Figure 2:
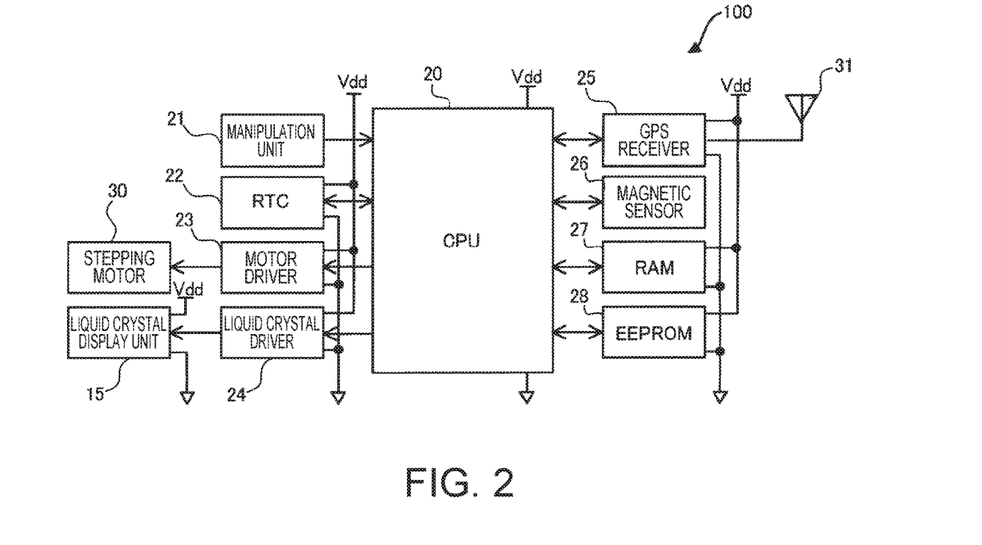
FIG. 2 is a block diagram illustrating a circuit configuration of the electronic timepiece.

FIG. 2 illustrates a circuit configuration of the electronic timepiece 100. As illustrated in FIG. 2, circuits of the electronic timepiece 100 include a CPU 20, a manipulation unit 21, an RTC 22, a motor driver 23, a liquid crystal driver 24, a GPS receiver 25, a magnetic sensor 26, a RAM 27, and an EEPROM 28.

Based on programs stored in the EEPROM 28, the CPU 20 controls a time display operation by the pointing hand 13, a reception operation of the GPS receiver 25, a declination angle specifying process based on positional information, an azimuth decision process based on the magnetic sensor 26 and a declination angle, an azimuth display process, and the like.

The manipulation unit 21 includes switches that turn on and off in tandem with the crown 16, the manipulation button 17, and the manipulation button 18. In the embodiment, when the switch of the manipulation unit 21 turns on in tandem with a manipulation on the manipulation button 17, the compass function is validated. Further, when the switch of the manipulation unit 21 turns on in tandem with a manipulation on the manipulation button 18, a time zone setting function is validated. Furthermore, when the switches of the manipulation unit 21 turn on in tandem with a simultaneous manipulation on the manipulation buttons 17 and 18, a declination angle specifying process starts. The details thereof will be described below.

The RTC 22 normally operates, measures an internal time for time display, and generates internal time information. The internal time information is time information measured internally in the electronic timepiece 100 and is updated in accordance with a reference clock signal generated by a crystal resonator (not illustrated). The CPU 20 controls a time display operation by the pointing hand 13 based on the internal time information generated by the RTC 22.

The motor driver 23 outputs a driving signal to the stepping motor 30 according to a control signal from the CPU 20. The plurality of stepping motors 30 are installed to correspond to pointing hands of the hour hand 13a, the minute hand 13b, the second hand 13c, and the chronograph hour hand small window 12 and a pointing hand of the indicator 14. The stepping motors 30 drive the pointing hands of the hour hand 13a, the minute hand 13b, the second hand 13c, and the chronograph hour hand small window 12 and the pointing hand of the indicator 14 according to the driving signals.

The liquid crystal driver 24 drives the liquid crystal display unit 15 according to display information from the CPU 20 and causes the liquid crystal display unit 15 to display a letter and the like according to the display information. The liquid crystal display unit 15 is driven by the liquid crystal driver 24 to display various kinds of information.

The GPS receiver 25 includes a reception circuit that is connected to an antenna 31 receiving radio waves from GPS satellites and processes a signal of the radio waves received by the antenna 31. The signal includes time information and positional information indicating a current position. The CPU 20 can acquire the time information and the positional information indicating a current position based on an output of the GPS receiver 25.

The magnetic sensor 26 serving as a magnetic detection unit is a biaxial magnetic sensor and, in the embodiment, measures geomagnetic components of two-axis directions parallel to the letter plate 11. The CPU 20 calculates a direction of a geomagnetic vector based on the geomagnetic components output from the magnetic sensor 26.

The RAM 27 is used as a work memory of the CPU 20 or a storage memory for temporary data. The EEPROM 28 is a nonvolatile memory that retains stored content even when the electronic timepiece is turned off and is configured so that rewriting can be executed. In the embodiment, the EEPROM 28 stores a current declination angle and a declination angle table so that the current declination angle and the declination angle table can be rewritten. The details of the declination angle table will be described below.

Figure 3:
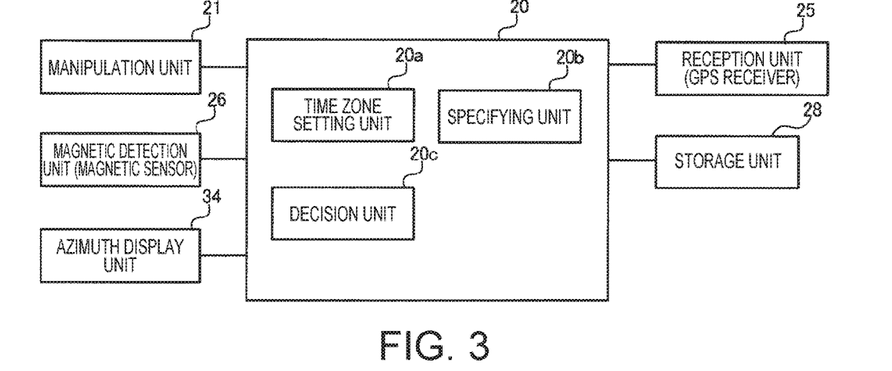
FIG. 3 is a diagram illustrating a functional block of the electronic timepiece.

FIG. 3 is a diagram illustrating a functional block of the electronic timepiece 100. As illustrated in FIG. 3, the CPU 20 functions as the time zone setting unit 20a, the specifying unit 20b, and the decision unit 20c by executing programs stored in the EEPROM 28 serving as a storage unit. The time zone setting unit 20a sets a time zone based on the time information and the positional position received by the GPS receiver 25 serving as a reception unit. The specifying unit 20b specifies a declination angle based on the positional information. The decision unit 20c decides an azimuth of the due north based on the declination angle and an output of the magnetic sensor 26 serving as a magnetic detection unit. The details of the functions of the time zone setting unit 20a, the specifying unit 20b, and the decision unit 20c will be described below.

An azimuth display unit 34 displays the direction of the due north decided by the decision unit 20c. In the embodiment, the motor driver 23, the stepping motor 30, the second hand 13c function as the azimuth display unit 34.

Figure 4:
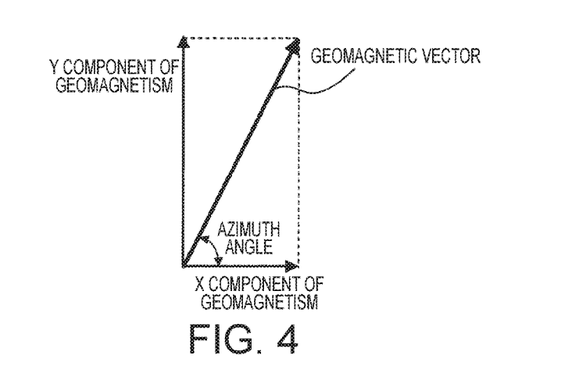
FIG. 4 is a diagram illustrating a relation between X and Y components of geomagnetism and a geomagnetic vector.

Next, the compass function in the electronic timepiece 100 according to the embodiment will be described. In the embodiment, the compass function is configured to operate by pressing the manipulation button 17. When it is detected that the switch of the manipulation unit 21 is turned on, the CPU 20 serving as the decision unit 20c determines that the manipulation button 17 is pressed and starts azimuth measurement. The azimuth measurement is executed by calculating the direction of the geomagnetic vector based on geomagnetic components output from the magnetic sensor 26. To obtain the geomagnetic vector, it is necessary to measure a horizontal component of the geomagnetism parallel to the letter plate 11. Therefore, the user horizontally maintains the letter plate 11. The magnetic sensor 26 measures an X component of the geomagnetism parallel to the letter plate 11 and a Y component of the geomagnetism parallel to the letter plate 11 and orthogonal in the X direction and outputs the X and Y components to the CPU 20 serving as the decision unit 20c. FIG. 4 is a diagram illustrating a relation between X and Y components of geomagnetism and a geomagnetic vector. As illustrated in FIG. 4, the CPU 20 calculates an azimuth angle of the geomagnetic vector obtained by composing the X component of the geomagnetism and the Y component of the geomagnetism. The azimuth angle is an azimuth angle of the magnetic north.

Figure 5:
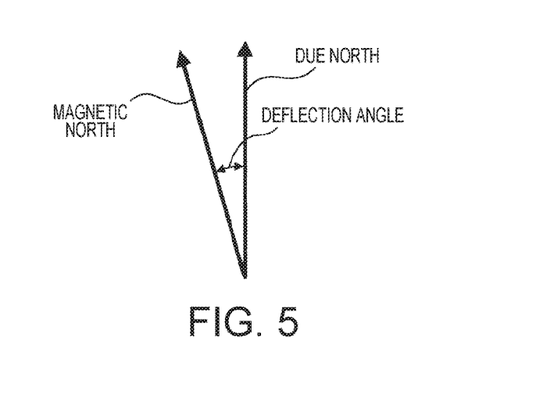
FIG. 5 is a diagram illustrating a relation between the due north, and a magnetic north and a declination angle.

FIG. 5 is a diagram illustrating a relation between the due north, and a magnetic north and a declination angle. The CPU 20 serving as the decision unit 20c calculates an azimuth angle of the due north and decides the direction of the due north by reading the declination angle stored in the EEPROM 28 and adding the declination angle to the azimuth angle of the magnetic north, as illustrated in FIG. 5. In this case, the declination angle is assumed to be specified by the specifying unit 20b and stored in the EEPROM 28 in advance.

The CPU 20 controls the motor driver 23 according to the calculated azimuth angle of the due north and rotates the stepping motor 30 so that the second hand 13c serving as an azimuth pointing hand is rotated toward the due north. In this way, in the embodiment, the motor driver 23, the stepping motor 30, and the second hand 13c function as the azimuth display unit 34 that displays the direction of the due north. In the embodiment, the azimuth measurement and the operation of the second hand 13c serving as the azimuth pointing hand, as described above, are repeated for a predetermined period at intervals of, for example, 0.5 seconds or 1 minute. In this way, the due north can be continuously pointed by the second hand 13c serving as the azimuth pointing hand.

Figure 6:
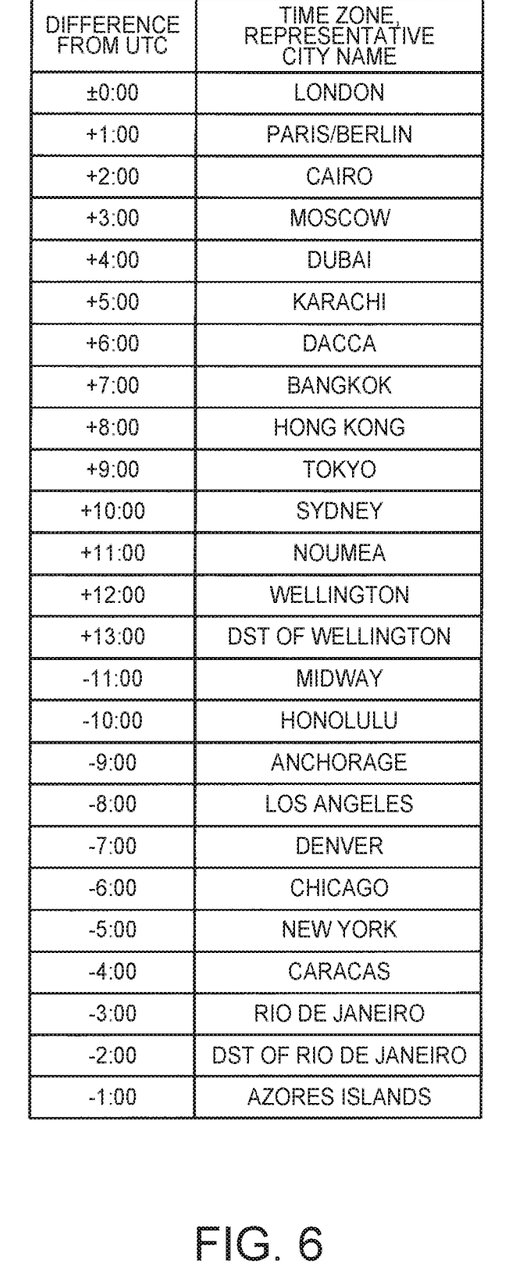
FIG. 6 is a diagram illustrating a relation between a time zone and a time difference from the UTC.

In the embodiment, the time zone setting function is configured to operate by pressing the manipulation button 18. The CPU 20 serving as the time zone setting unit 20a causes the GPS receiver 25 to receive the time information and the positional information of a current position when it is detected that the switch of the manipulation unit 21 is turned on. FIG. 6 is a diagram illustrating a relation between a time zone and a time difference from the UTC (coordinated universal time). The CPU 20 serving as the time zone setting unit 20a determines to which time zone the current position belongs based on the positional information received by the GPS receiver 25 and sets the time zone. The set time zone is stored in the EEPROM 28.

As described above, when the time zone is set, the positional information of the current position is acquired by the GPS receiver 25. Accordingly, in the embodiment, when the time zone is set, a declination angle updating process is executed based on the positional information acquired at that time. A case in which it is necessary to set the declination angle value again is a case of considerable movement on the Earth. This is because this case is similar to a situation in which it is necessary to set the time zone. When the positional information of the current position is acquired by the GPS receiver 25 at the time of setting the time zone, as described above, the CPU 20 serving as the specifying unit 20b specifies a declination angle based on the positional information with reference to a declination angle table stored in the EEPROM 28. The declination angle table is generated using, for example, a magnetic declination angle distribution map or the like. The magnetic declination angle distribution map is a map indicating a relation between declination angle distribution, and a latitude and a longitude on the Earth. In the magnetic declination angle distribution map, the vertical axis represents a latitude and the horizontal axis represents a longitude. The declination angle is indicated by, for example, an equal declination angle line at intervals of 5 degrees or the like. In the embodiment, such a magnetic declination angle distribution map is divided in a mesh form of every 10 degrees in both the latitude and the longitude and a declination angle table indicating a declination angle at coordinates of the latitude and longitude is generated in advance. The declination angle table is stored in the EEPROM 28 so that the declination angle table can be rewritten. When the positional information of the current position can be acquired as coordinates of the latitude and longitude, a declination angle corresponding to the coordinates can be specified in the declination angle table. When the positional information of the current position is acquired by the GPS receiver 25 at the time of setting the time zone, as described above, the CPU 20 serving as the specifying unit 20b determines to which coordinate values the positional information belongs in the declination angle table. Then, the CPU 20 reads the declination angle corresponding to the coordinate values from the declination angle table and specifies a declination angle at the current position. The CPU 20 updates the declination angle stored in the EEPROM 28 in accordance with the specified declination angle.

For the declination angle, a geomagnetic model such as the international geomagnetic reference field (IGRF) or the world magnetic model (WMM) can also be used. The geomagnetic model is a numerical equation indicating a magnetism distribution. When the positional information of the current position can be acquired as coordinates, the declination angle of the current position can be obtained using the geomagnetic model. In the embodiment, instead of storing the above-described declination angle table in the EEPROM 28, the geomagnetic model and geomagnetic parameters may be stored in the EEPROM 28. In this case, when the positional information of the current position is acquired by the GPS receiver 25, the CPU 20 serving as the specifying unit 20b may calculate the declination angle and specify the declination angle of the current position using the geomagnetic model stored in the EEPROM 28.

However, in a case in which the declination angle is calculated using the geomagnetic model, the load of the CPU 20 increases and power consumption thus increases. Accordingly, the coordinates of the Earth may be divided in a mesh form at intervals of 10 degrees in both the latitude and longitude, a declination angle at each of the divided coordinates may be calculated in advance using a geomagnetic model, and a declination angle table may be generated. Then, the declination angle table generated using the geomagnetic model in this way may be stored in the EEPROM 28. In this case, when the positional information of the current position is acquired by the GPS receiver 25, the CPU 20 serving as the specifying unit 20b may calculate a declination angle and specify the declination angle of the current position using the declination angle table generated in accordance with the geomagnetic model and stored in the EEPROM 28.

In this way, according to the embodiment, when the time zone is set and the positional information is acquired by the GPS receiver 25, the declination angle updating process is executed using the positional information. Therefore, an operation of the GPS receiver 25 in which power consumption is large can be suppressed as much as possible. By causing the GPS receiver 25 to operate only once, both the setting of the time zone and the declination angle updating process can be executed, thereby increasing a battery life. Even when a manipulation in which the user examines a declination angle written on a map or the like and inputs the declination angle is not executed, the declination angle updating process is executed based on the positional information acquired at the time of setting the time zone. Therefore, it is not necessary for the user to make complicated preparation.

Second Embodiment

Figure 7:
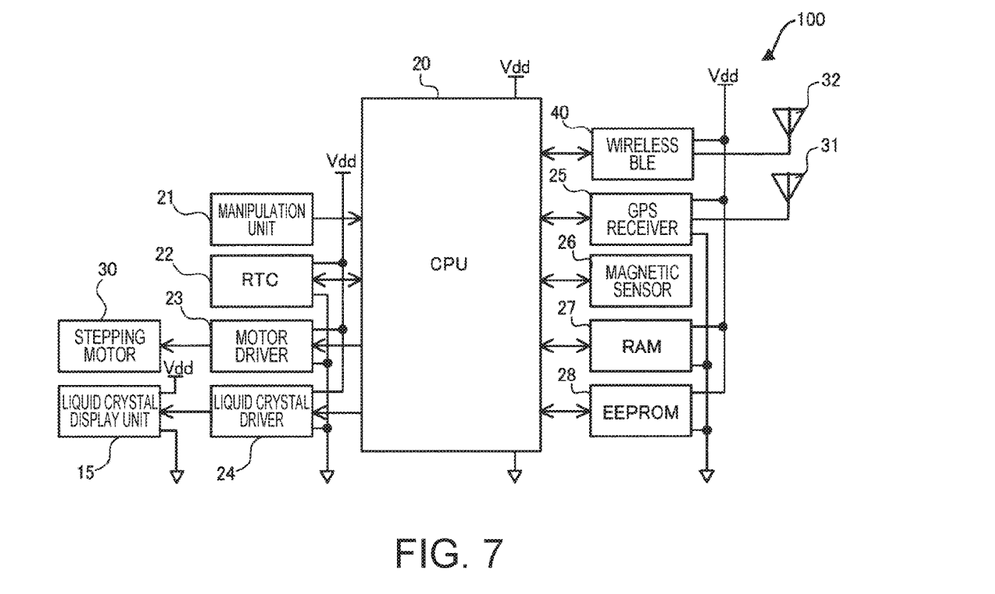
FIG. 7 is a block diagram illustrating an example of a circuit unit of an electronic timepiece according to a second embodiment of the invention.
Figure 8:
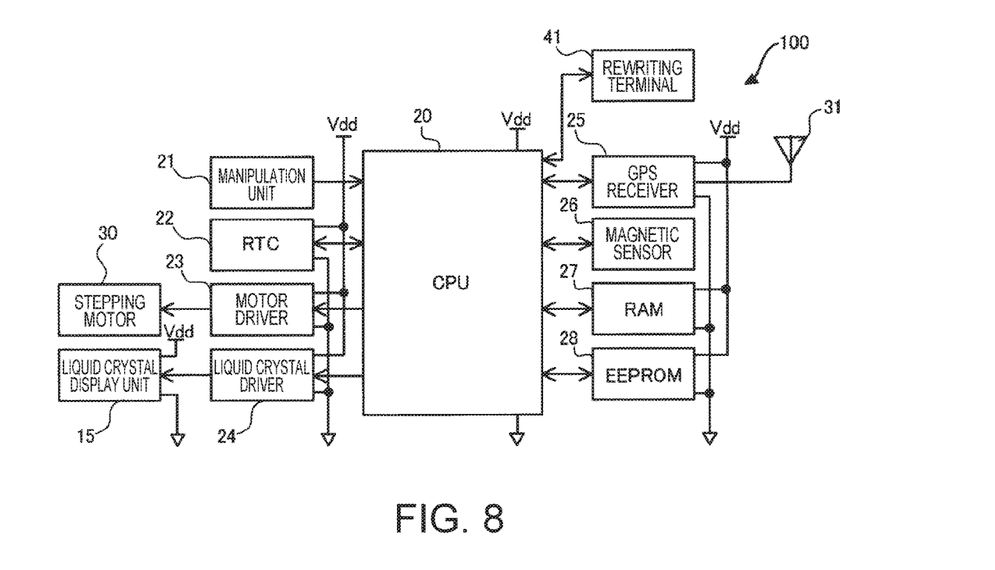
FIG. 8 is a block diagram illustrating another example of the circuit unit of the electronic timepiece according to the second embodiment of the invention.

A second embodiment of the invention will be described with reference to FIGS. 7 and 8. In the embodiment, geomagnetic parameters or a declination angle table rewriting function in the electronic timepiece 100 will be described. FIG. 7 is a block diagram illustrating an example of a circuit unit of an electronic timepiece 100 according to the second embodiment. As illustrated in FIG. 7, the electronic timepiece 100 according to the embodiment includes a low-power wireless communication chip 40 by Bluetooth (registered trademark) low energy. The low-power wireless communication chip 40 enables wireless communication by Bluetooth (registered trademark) via an antenna 32.

Since the magnetic poles of the Earth constantly move, magnetic declination angles change over time. In the geomagnetic model, a geomagnetic parameter for calculating the geomagnetic model is sometimes updated. Accordingly, in the embodiment, the geomagnetic parameter of the geomagnetic model for calculating a declination angle or the declination angle table calculated from the geomagnetic model is stored in the EEPROM 28 so that the geomagnetic parameter or the declination angle table can be rewritten.

An updating program for the geomagnetic parameter or the declination angle table calculated from the geomagnetic model is stored in advance in the EEPROM 28. The updating program may be executed by the CPU 20 according to a manipulation on the crown 16 or the manipulation button 17 or 18 or may be executed by the CPU 20 for each predetermined period. When the CPU 20 executes the updating program, the CPU 20 acquires the geomagnetic parameter or the declination angle table calculated from the geomagnetic model from an external device via the low-power wireless communication chip 40. Then, the CPU 20 updates the geomagnetic parameter or the declination angle table stored in the EEPROM 28 using the acquired geomagnetic parameter or declination angle table. In this way, it is possible to update the geomagnetic parameter or the declination angle table calculated from the geomagnetic model to a recent geomagnetic parameter or declination angle table.

The CPU 20 may execute the updating program when the low-power wireless communication chip 40 receives an updating instruction from an external device. The electronic timepiece 100 may have a firmware updating function and the geomagnetic parameter or the declination angle table calculated from the geomagnetic model may be transmitted from an external device to the electronic timepiece 100 along with firmware. In this case, when the low-power wireless communication chip 40 receives the geomagnetic parameter or the declination angle table along with the firmware, the CPU 20 updates the geomagnetic parameter or the declination angle table stored in the EEPROM 28. In this way, it is also possible to update the geomagnetic parameter or the declination angle table calculated from the geomagnetic model to a recent geomagnetic parameter or declination angle table.

The above-described updating instruction, geomagnetic parameter, or declination angle table calculated from the geomagnetic model is not limited to the configuration in which the updating instruction, the geomagnetic parameter, or the declination angle table is received by the low-power wireless communication chip 40. FIG. 8 is a block diagram illustrating another example of the circuit unit of the electronic timepiece 100 according to the embodiment. As illustrated in FIG. 8, a rewriting terminal 41 connected to the CPU 20 may be included. For example, the rewriting terminal 41 is disposed to be connected to an external device when a back cover of the electronic timepiece 100 is opened. In this way, when an external device is connected to the rewriting terminal 41, the above-described updating instruction, geomagnetic parameter, or declination angle table can be transmitted from an external device. In this way, it is also possible to update the geomagnetic parameter or the declination angle table calculated from the geomagnetic model to a recent geomagnetic parameter or declination angle table.

Third Embodiment

Figure 9:
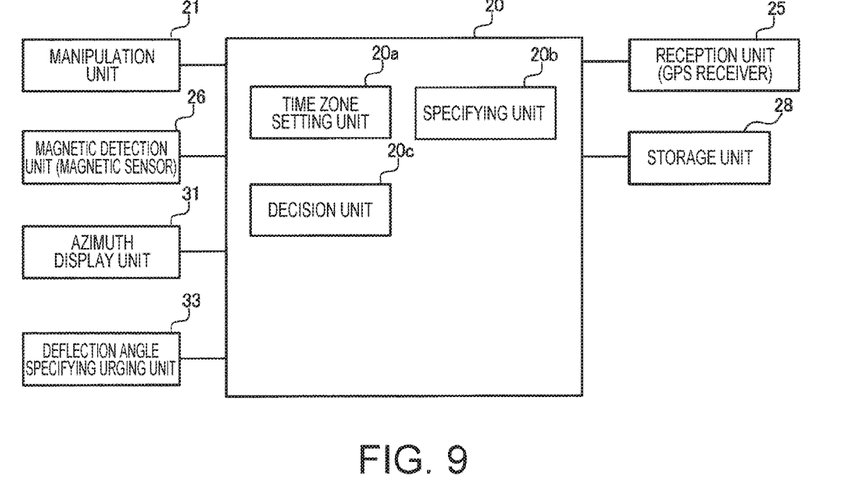
FIG. 9 is a diagram illustrating functional blocks of an electronic timepiece according to a third embodiment of the invention.
Figure 10:
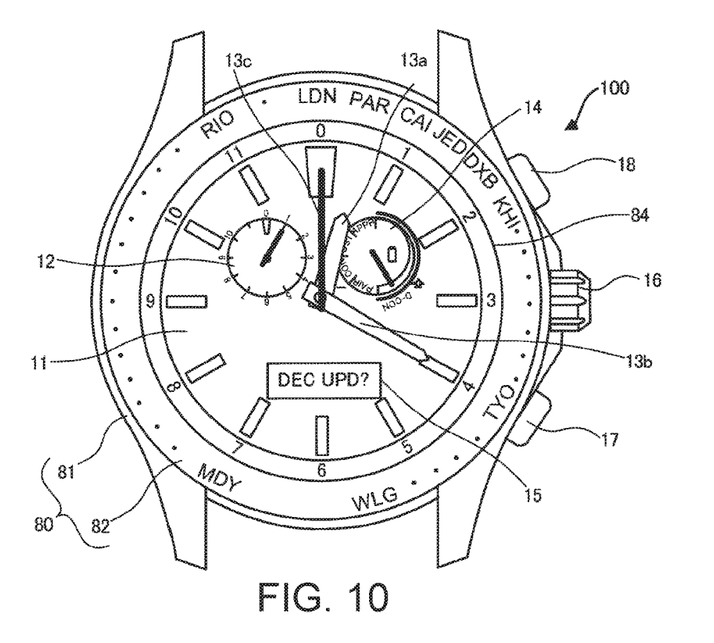
FIG. 10 is a diagram illustrating an example in which a second hand is matched to an LDN displayed in a bezel.

A third embodiment of the invention will be described with reference to FIGS. 9 and 10. In the above-described embodiment, the example has been described in which the GPS receiver 25 acquires the positional information of the current position at the time of setting the time zone and simultaneously specifies the declination angle using the positional information. In the embodiment, at the time of manually setting a time zone, a user is urged to start specifying a declination angle. FIG. 9 is a diagram illustrating functional blocks of an electronic timepiece 100 according to the embodiment. As illustrated in FIG. 9, the electronic timepiece 100 according to the embodiment includes a declination angle specifying urging unit 33. In the embodiment, the liquid crystal display unit 15 that displays a message for urging to start specifying a declination angle functions as the declination angle specifying urging unit 33 under the control of the CPU 20.

The time zone can be set manually by the user without using GPS. In the embodiment, for example, when the user further extracts the crown 16 and presses the manipulation button 17, a manual time zone setting mode is set. In this state, the user matches the second hand 13c to one time zone desired to be displayed in the bezel 82 by manipulating the crown 16. FIG. 10 illustrates an example in which the second hand 13c is matched to the LDN displayed in the bezel 82. The CPU 20 serving as the time zone setting unit 20a updates a current time zone to a designated time zone in a case in which one time zone is designated by the second-hand 13c in the manual time zone setting mode. In the example illustrated in FIG. 10, the CPU 20 sets the time zone to a London time zone. The set time zone is stored in the EEPROM 28. In this way, in the embodiment, the CPU 20 serving as the time zone setting unit 20a sets a time zone according to a user manipulation on the pointing hand (the second hand 13c).

A case in which it is necessary to set a time zone is a case of a movement from a certain nation to another nation. Therefore, it is considered that it is also necessary to update a declination angle. Accordingly, in the embodiment, the CPU 20 causes the liquid crystal display unit 15 serving as the declination angle specifying urging unit 33 to display a message for urging to execute a manipulation of starting specifying a declination angle. In the example illustrated in FIG. 10, the liquid crystal display unit 15 is caused to display a message "DEC UPD?". "DEC UPD?" is the abbreviation for "DECLINATION UPDATE?".

In a case in which the user desires to start specifying a declination angle, for example, the user presses the manipulation button 18 in this state. The CPU 20 serving as the specifying unit 20b starts a declination angle updating process when the CPU 20 detects that the switch of the manipulation unit 21 corresponding to the manipulation button 18 is turned on in the manual time zone setting mode. The declination angle updating process is the same as the process described in the first embodiment. The GPS receiver 25 is activated to acquire positional information of the current position and a declination angle is specified based on the positional information. Further, the CPU 20 serving as the specifying unit 20b updates the specified declination angle as a current declination angle and stores the specified declination angle in the EEPROM 28.

In the embodiment, in the case in which the user desires the declination angle updating process, the declination angle updating process is executed. Therefore, an operation of the GPS receiver 25 in which power consumption is large can be suppressed as much as possible. Accordingly, the declination angle can be updated while increasing a battery life and even when a user manipulation of examining a declination angle written on a map or the like and inputting the declination angle is not executed.

In a case in which the time zone is manually set, the declination angle updating process may be executed without displaying a message for urging to start specifying a declination angle, as described above. In this case, the CPU 20 serving as the specifying unit 20b functions as a specifying unit that specifies a declination angle in a case in which the time zone is manually set. Even in this case, since the declination angle updating process is executed to be matched to the manual setting of the time zone, an operation of the GPS receiver 25 in which power consumption is large can be suppressed as much as possible. Accordingly, the declination angle can be updated while increasing a battery life and even when a user manipulation of examining a declination angle written on a map or the like and inputting the declination angle is not executed.

Fourth Embodiment

A fourth embodiment of the invention will be described with reference to FIGS. 11 and 12. In the above-described embodiment, the example has been described in which a declination angle is specified or the specifying of a declination angle is urged to be started at the time of setting the time zone. In the embodiment, irrespective of setting a time zone, a declination angle adjustment process is executed in a declination angle adjustment processing mode. In the embodiment, for example, when a user further extracts the crown 16 and presses the manipulation button 18, a declination angle adjustment processing mode is set.

Figure 11:
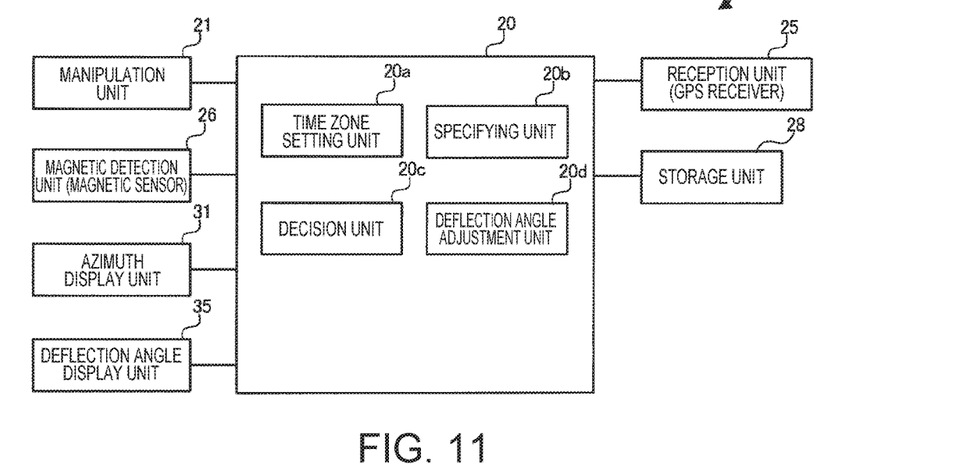
FIG. 11 is a diagram illustrating functional blocks of an electronic timepiece according to a fourth embodiment of the invention.
Figure 12:
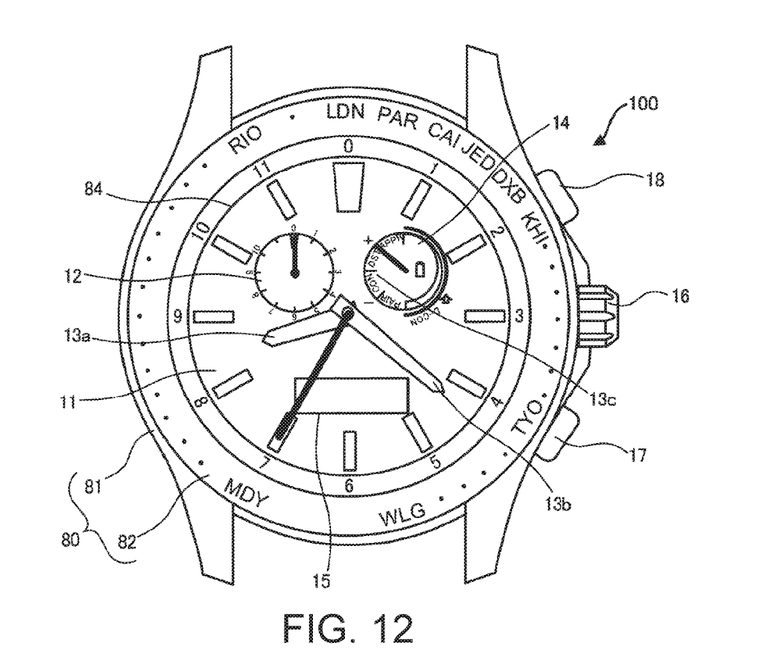
FIG. 12 is a diagram illustrating an example of display of a declination angle according to the fourth embodiment of the invention.

FIG. 11 is a diagram illustrating functional blocks of an electronic timepiece 100 according to the embodiment. As illustrated in FIG. 11, the electronic timepiece 100 according to the embodiment includes a declination angle display unit 35 and a declination angle adjustment unit 20d. The declination angle display unit 35 displays a declination angle stored in the EEPROM 28 under the control of the CPU 20 when a mode of the electronic timepiece 100 enters the declination angle adjustment processing mode. The declination angle stored in the EEPROM 28 is a declination angle specified by the CPU 20 serving as the specifying unit 20b. As illustrated in FIG. 12, the pointing hand of the chronograph hour hand small window 12, the pointing hand of the indicator 14, and the second hand 13c are used to display a declination angle. The pointing hand of the chronograph hour hand small window 12 indicates a 100 place and a 10 place of a declination angle and the secondhand 13c indicates a 1 place. The pointing hand of the indicator 14 indicates the polarity of the east and west by + and − of the indicator 14. A case in which the magnetic north is inclined to the right of the due north is assumed to be the east and a case in which the magnetic north is inclined to the left of the due north is assumed to the west. In the embodiment, + of the indicator 14 indicates the east and the − of the indicator 14 indicates the west. FIG. 12 is a diagram illustrating an example of display of a declination angle according to the fourth embodiment. In the example illustrated in FIG. 12, since the pointing hand of the indicator 14 points +, it can be understood that the east is indicated. Since the pointing hand of the chronograph hour hand small window 12 points 0, the 100 place and the 10 place of the declination angle are 0. Further, since the second hand 13c points 7:00, the 1 place of the declination angle is 7. Accordingly, in the example illustrated in FIG. 12, it can be understood that the declination angle is easterly 7 degrees. In this way, in the embodiment, the pointing hand of the chronograph hour hand small window 12, the pointing hand of the indicator 14, and the second hand 13c driven under the control of the CPU 20 function as the declination angle display unit 35.

When the mode of the electronic timepiece 100 enters the declination angle adjustment processing mode, the declination angle specified by the CPU 20 serving as the specifying unit 20b is first displayed by the pointing hand of the chronograph hour hand small window 12, the pointing hand of the indicator 14, and the second hand 13c. In the declination angle adjustment processing mode, the user can adjust the declination angle by manipulating the crown 16 to rotate the second hand 13c. In the embodiment, a rotation detection unit detecting rotation of the crown 16 is included as the manipulation unit 21. When the rotation detection unit of the manipulation unit 21 detects rotation of the crown 16, the CPU 20 serving as the declination angle adjustment unit 20d rotates the second hand 13c according to the rotation of the crown 16. Thus, the declination angle displayed by the declination angle display unit 35 can be adjusted according to a user manipulation. When the user adjusts the declination angle by rotating the crown 16 and subsequently presses, for example, the manipulation button 18, the CPU 20 serving as the declination angle adjustment unit 20d reads the number of seconds pointed by the second hand 13c at that time point and stores the number of seconds as the value of the adjusted declination angle in the EEPROM 28. In this way, in the embodiment, the CPU 20 functions as the declination angle adjustment unit 20d that adjusts a declination angle displayed by the declination angle display unit 35 according to a user manipulation.

As described above, according to the embodiment, when a declination angle is adjusted, the CPU 20 serving as the specifying unit 20b first displays a declination angle specified based on the positional information and subsequently the user adjusts the declination angle. Accordingly, it is possible to adjust the declination angle through a minimum manipulation.

MODIFICATION EXAMPLES

The invention is not limited to the above-described embodiments. For example, various modification examples to be described below can be realized. Further, one modification example or a plurality of modification examples selected arbitrarily from the modification embodiments to be described below can also be appropriately combined.

Modification Example 1

In the above-described embodiments, the example has been described in which the positional information of the current position is acquired from the GPS satellites. However, the positional information of the current position may be acquired from base station information or the like of Wi-Fi (registered trademark).

Modification Example 2

In the above-described embodiments, the example has been described in which the updating of a declination angle is urged or the declination angle updating process is executed when the time zone is set, but the invention is not limited to such a configuration. For example, when a declination angle is adjusted, setting of a time zone may be urged or a time zone setting process may be executed.

Modification Example 3

In the above-described embodiments, the example has been described in which the updating of a declination angle is urged using the liquid crystal display unit 15. However, the updating of a declination angle may be urged using the pointing hand 13, the pointing hand of the indicator 14, or the pointing hand of the chronograph hour hand small window 12. Alternatively, the updating of a declination angle may be urged by combining these pointing hands.

The entire disclosure of Japanese Patent Application No. 2016-064042, filed Mar. 28, 2016 is expressly incorporated by reference herein.

What is claimed is:

1. An electronic timepiece comprising:
   a magnetic detection unit;
   a reception unit that receives positional information of a current position;
   a specifying unit that specifies a controller-determined declination angle based on the positional information;
   a declination angle adjustment unit that allows a user to adjust the controller-determined declination angle to a user-adjusted declination angle;
   a decision unit that decides a direction of a due north based on a output of the magnetic detection unit and the user-adjusted declination angle;
   an azimuth display unit that displays the direction of the due north decided by the decision unit; and
   a declination angle display unit that displays at least one of the controller-determined declination angle and the user-adjusted declination angle,
   wherein a hand of the timepiece indicates the direction of the due north in a compass mode and the hand of the timepiece indicates the at least one of the controller-determined declination angle and the user-adjusted declination angle in a declination angle adjustment processing mode.

2. The electronic timepiece according to claim 1, further comprising:
   a time zone setting unit that sets a time zone,
   wherein the specifying unit specifies the controller-determined declination angle based on the positional information used when the time zone setting unit sets the time zone.

3. The electronic timepiece according to claim 1,
   wherein the specifying unit specifies the controller-determined declination angle using a geomagnetism distribution.

4. The electronic timepiece according to claim 1, further comprising:
   a storage unit that stores a declination angle table in which a plurality of controller-determined or user-adjusted declination angles are associated with a plurality of pieces of positional information,
   wherein the specifying unit specifies the controller-determined declination angle using the declination angle table.

5. The electronic timepiece according to claim 4,
   wherein the storage unit stores the declination angle table so that the declination angle table is able to be rewritten.

6. The electronic timepiece according to claim 1, further comprising:
   a time zone setting unit that sets a time zone according to a manipulation on a pointing hand by a user,
   wherein the specifying unit is a specifying unit that starts specifying the controller-determined declination angle according to a starting manipulation by the user, and
   wherein the electronic timepiece further comprises:
   a declination angle specifying urging unit that urges the starting manipulation in a case in which the time zone setting unit sets the time zone.

7. The electronic timepiece according to claim 1, further comprising:
   a time zone setting unit that sets a time zone according to a manipulation on a pointing hand by a user,
   wherein the specifying unit specifies the controller-determined declination angle in a case in which the time zone setting unit sets the time zone.

* * * * *